United States Patent [19]
Furumura et al.

[11] Patent Number: 4,904,094
[45] Date of Patent: Feb. 27, 1990

[54] BALL-AND-ROLLER BEARING SYSTEM

[75] Inventors: Kyozaburo Furumura, Kanagawa; Yasuo Murakami, Yamato; Youichi Matsumoto, Fujisawa; Kenji Takei; Takaaki Shiratani, both of Hiratsuka; Soji Nishida, Fujisawa, all of Japan

[73] Assignee: Nippon Seiko Kabushiki Kaisha, Tokyo, Japan

[21] Appl. No.: 225,899

[22] Filed: Jul. 29, 1988

[30] Foreign Application Priority Data

Aug. 25, 1987 [JP] Japan ............................. 62-209167

[51] Int. Cl.⁴ ............................................. F16C 19/49
[52] U.S. Cl. ................................... 384/492; 384/625; 148/318; 148/319; 148/906
[58] Field of Search ................ 384/625, 58, 913, 492; 148/906, 318, 319

[56] References Cited

U.S. PATENT DOCUMENTS

| | | | |
|---|---|---|---|
| 2,194,178 | 3/1940 | Becket et al. | 148/31 |
| 3,117,041 | 1/1964 | Koistinen | 148/39 |
| 3,275,389 | 12/1963 | Neilson et al. | 384/625 |
| 3,713,905 | 1/1973 | Philip et al. | 148/36 |
| 4,023,988 | 5/1977 | Stickels et al. | 148/906 |
| 4,191,599 | 3/1980 | Stickels et al. | 148/906 |
| 4,659,241 | 4/1987 | Bamberger et al. | 384/625 |

FOREIGN PATENT DOCUMENTS 50-1339 1/1975 Japan.
857308 12/1960 United Kingdom ................ 384/625

Primary Examiner—Deborah Yee
Attorney, Agent, or Firm—Shapiro and Shapiro

[57] ABSTRACT

A rolling bearing, comprising an inner race, an outer race and rolling members which roll therebetween, at least one of the inner and outer races being subjected to carburizing and heating treatment, is characterized in that:

the one race comprises a carbon steel containing 0.1 to 0.7 wt. % of carbon, with the residual austenite content on the track surface layer being 20 to 45 vol. % and the rolling members comprise a carbon steel containing 0.7 to 1.1 wt. % of carbon having carbonitriding and heating treatment applied on the surface layer, with the residual austenite content in such surface layer being 20 to 45 vol. % and the carbonitride in such surface being 3 to 15 vol. %.

In another form of the bearing, the rolling members may comprise a carbon steel containing 0.1 to 0.7 wt. % of carbon, with the surface layers thereof being subjected to carburizing and heating treatment and having a residual austenite content of 20 to 45 vol. %.

5 Claims, 6 Drawing Sheets

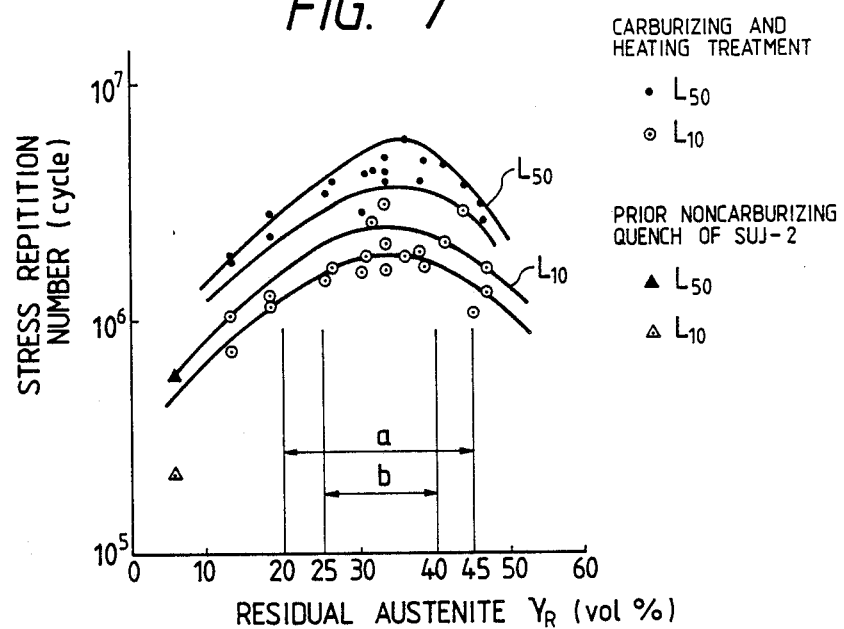
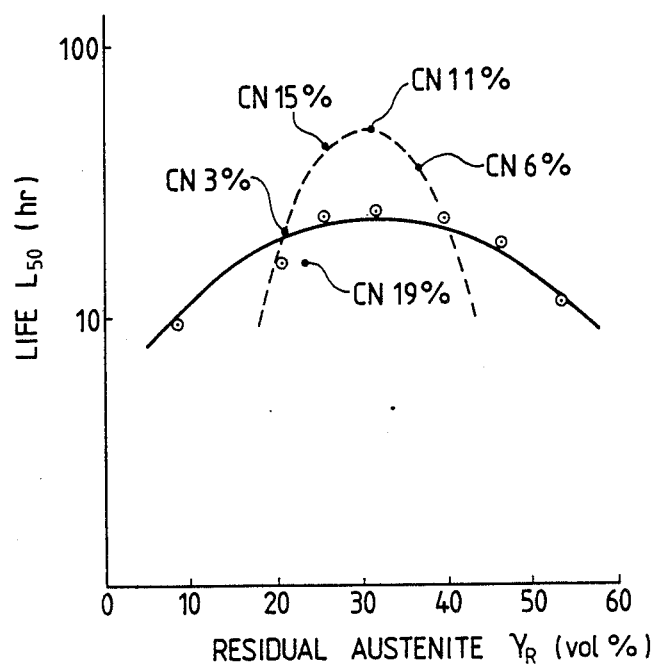

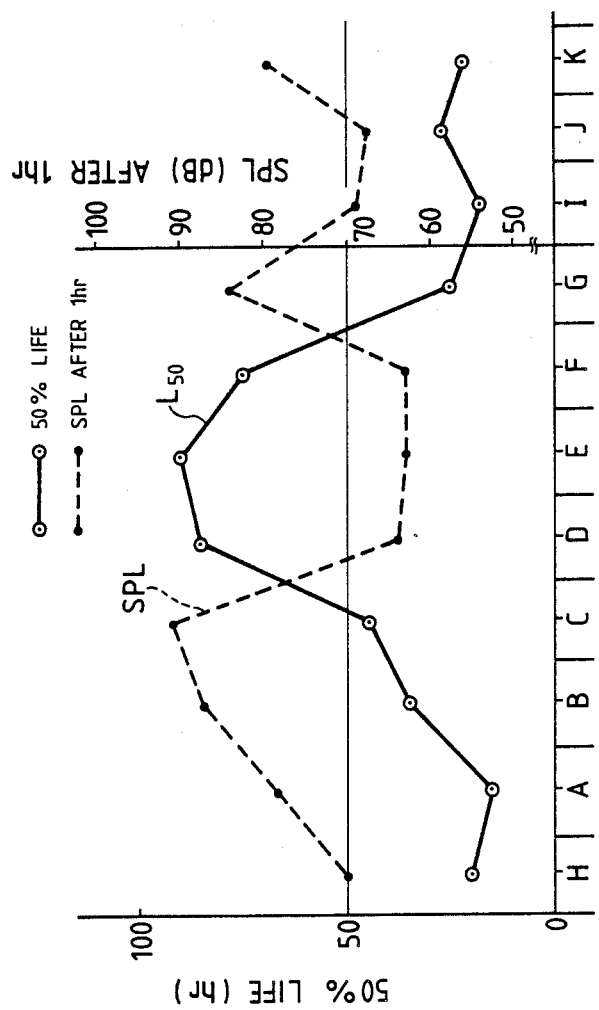

BALL-AND-ROLLER BEARING SYSTEM

BACKGROUND OF THE INVENTION

1. Field of the Invention

This invention relates to a rolling bearing to be used for automobiles, agricultural machines, construction machines and steel machines, etc., particularly to a rolling bearing for use in a transmission or engine.

2. Related Background Art

As is well known in the art, the lubricant oil of a rolling bearing is subject to entrainment of foreign substances such as cut powder, dreg, flash, abraded powder, etc. Such substances may cause damage to the rolling members and inner and outer races of the bearing, and thus shorten the life of the bearing. The life of the bearing may be shortened in some cases even to about one tenth as compared with the case when there is substantially no entrainment of foreign substance in the lubricant oil.

For solving this problem, the following improvements have been proposed in the prior art.

(a) Increased hardness of the inner and outer races and rolling members. For example, SUJ2 bearing steel may be subject to hardening in brine to enhance the hardness of the bearing to a Rockwell hardness $H_RC$ of 64 or higher.

(b) Make carburized hardened layer of inner and outer races and rolling members deeper. For example, a carbon steel with a carbon content of about 0.5 wt.% or less such as SCR 420, 430, and SAE 4320 and 4340 may be subjected to carburizing and heating treatment for a long time. The intended result is to improve bearing life by increasing resistance to formation of impressions on the race surfaces and on the rolling member contact surfaces.

(c) Enhance crack toughness of the material.

For example, temperature controlled heating treatment such as martempering, etc. may be applied to a bearing steel such as SUJ3 or SUJ5. Enhanced crack toughness is intended to retard progress of cracks which form at surface impressions.

The measures which have been used in the prior art as described above involve the following problems which render them inadequate.

First, concerning (a), the high hardness of inner and outer races and rolling members results in poor toughness of the race surfaces and the surfaces of the rolling members. Thus, even though foreign substances may only form very slight impressions, cracks form at any early stage at the damage sites, and flaking (peel-off) is liable to occur through propagation of cracks. Consequently, the life of the bearing is not improved.

Concerning measures (b) and (c), deeper carburizing hardening requires longer hardening time, while the use of special temperature-controlled heating treatment reduces heating treatment productivity. Further, even with such heating treatment, sufficient bearing life is still not obtained.

SUMMARY OF THE INVENTION

Accordingly, an object of the present invention is to overcome the drawbacks of the prior art as described above and to provide a rolling bearing having life equal to or higher than the bearings of the prior art when the bearing is used under clean lubrication, longer life than the bearings of the prior art when used under lubrication with entrainment of foreign substances, and high reliability under both conditions of lubrication.

Another object of the present invention is to provide a rolling bearing, comprising an inner race, an outer race and rolling members which roll therebetween, at least one of said inner and outer races being subjected to carburizing and heating treatment, characterized in that:

at least one of said inner and outer races comprises a carbon steel containing 0.1 to 0.7 wt.% of carbon, with a residual austenite content on the track surface layer of 20 to 45 vol.%, said rolling members comprise a carbon steel containing 0.7 to 1.1 wt.% of carbon having carbonitriding and heating treatment applied on the surface layer, with a residual austenite content in said surface layer being 20 to 45 vol.% and the carbonitride in said surface layer being 3 to 15 vol.%.

Still another object of the present invention is to provide a rolling bearing, comprising an inner race, an outer race and rolling members which roll therebetween, at least one of said inner and outer races being subjected to carburizing and heating treatment, characterized in that:

at least one of said inner and outer races comprises a carbon steel containing 0.1 to 0.7 wt.% of carbon, with a residual austenite content on the track surface layer of 20 to 45 vol.%, said rolling members comprise a carbon steel containing 0.1 to 0.7 wt.% of carbon having carburizing and heating treatment applied on the surface layer, with the residual austenite content in said surface layer being 20 to 45 vol.%.

BRIEF DESCRIPTION OF THE DRAWINGS

FIG. 7 is a graph showing the relationship between bearing rotating fatigue life and residual austenite content under lubrication with entrainment of foreign substances;

FIG. 8 is a similar graph for a roller;

FIG. 9 is a graph showing life and sound pressure level of the respective Examples of the present invention and the respective Comparative examples shown in Table 1 and Table 2;

DESCRIPTION OF THE PREFERRED EMBODIMENTS

The present invention is the result of an extensive investigative effort. As will be explained below, the bearing of the present invention has a life equal to or longer than the bearings of the prior art under clean lubrication, and longer life under lubrication with entrainment of foreign substances.

With reference to FIG. 2 through FIG. 5, the importance of residual austenite content in the present invention is to be described.

Figure 3:
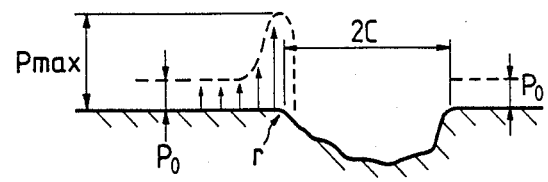
FIG. 3 is a sectional view of an impression shown together with stress distribution.

When a bearing is used under lubrication with entrained foreign substances, impressions such as shown in FIG. 3 are formed on the respective rolling surfaces of inner and outer races for example due to repeated contact with foreign substances. As can be seen from the sectional view of the impression shown in FIG. 3, an edge portion is formed at the impression. The radius of curvature r of the edge portion and the radius c of the impression are closely related with the residual austenite content. Ordinarily, residual austenite is soft, having about Hv of 300 (depends on the content of carbon in the material) and, when the residual austenite is permitted to exist at a desired ratio in the surface layer, concentration of stress at the edge portion of the impression can be relaxed, and propagation of microcracks generated at the impression thus can be retarded. The residual austenite in the surface layer is subject to martensitic transformation and to be hardened by the deformation energy applied on the surface after a predetermined number of passes of the couterpart member (e.g. track race relative to rolling member) over the impression during rolling. As shown in the graph shown in FIG. 2, which depicts two cases, the radius of curvature r at the impression edge portion has an inflection point at the position of about 5% of the total life of bearing, for example, at an impression passing number of about $2.2 \times 10^5$, and the radii of curvature at that time become $r_1$ and $r_2$, respectively. The point $P_1$ and the point $P_2$ show respectively the time when cracks occurred, while the point $F_1$ and the point $F_2$ respectively show the flaking generation points life). Since the radius of curvature r substantially reaches a maximum value at the impression passing number of around 5% or higher of the total life of the bearing, rolling fatigue is considered below in connection with the present invention on the basis of the radius of curvature at the impression edge portion and the radius c of the impression at 5% of the total life of the above bearing.

Figure 4:
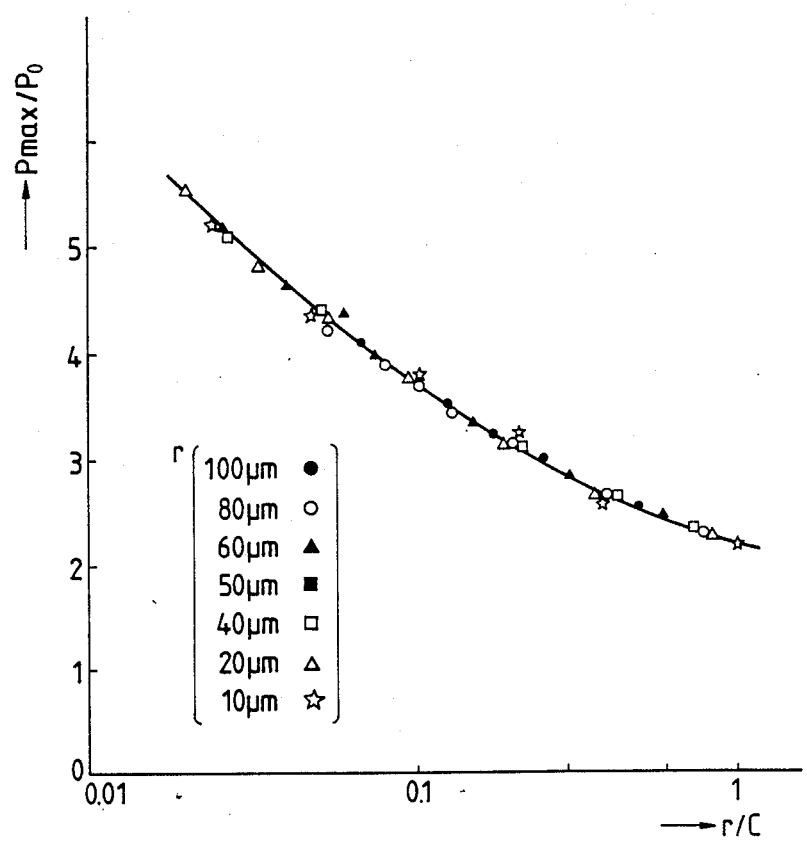
FIG. 4 is a graph showing the relationship between (1) the ratio of radius of curvature r of the edge portion of the impression to radius c of the impression and (2) the ratio of the maximum stress Pmax applied on the edge portion to the stress Po applied on the rotating surface other than at the impression.

FIG. 4 is a graph showing the relationship between the ratio of the stress Po applied on the rolling surface other than at the impression to the maximum stress Pmax applied on the edge portion, and the ratio r/c determined by varying the radius of curvature r from 10 to 100 μm. For making Pmax/Po smaller, namely for enhancing the stress relaxation effect, r must be larger when c is constant to increase r/c. As will be appreciated from FIG. 4, stress concentration at the edge portion can be relaxed by making r/c larger, whereby life of the bearing can be improved.

Figure 5:
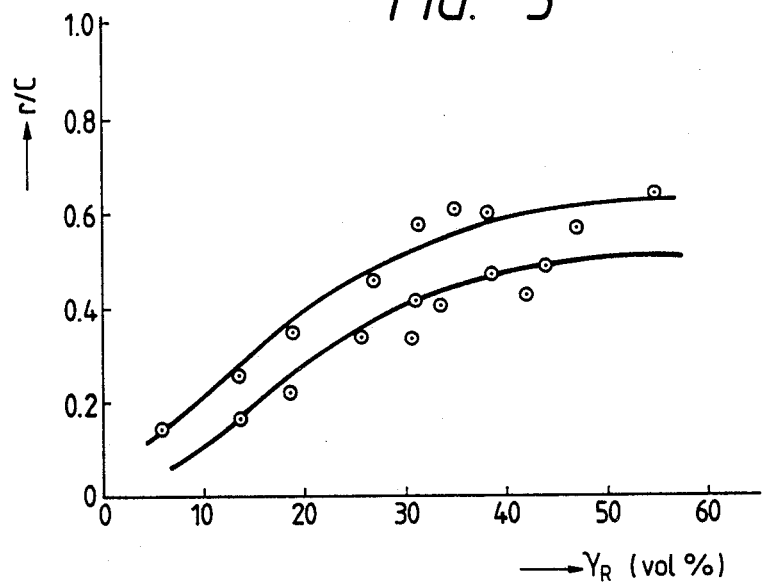
FIG. 5 is a graph showing the relationship between r/c and the residual austenite ($\gamma R$) content.

FIG. 5 shows the relationship of residual austenite $\gamma_R$ versus r/c value. As was indicated in connection with FIG. 4, the value of r/c is indicative of the extent of relaxation of stress concentration, and increase in this value leads to extension of life. However, as can be understood from FIG. 5, although the ratio of residual austenite $\gamma_R$ may be increased, the value of r/c eventually ceases to increase. Particularly, when the residual austenite $\gamma_R$ becomes 45 vol.% or more, this is markedly seen and the plot of r/c becomes substantially flat at higher levels of residual austenite. Accordingly, the surface hardness will be lowered to lower the rolling fatigue life. From this fact, a critical upper limit value 45 vol.% of residual austenite $\gamma_R$ has been derived.

As described above, in the residual austenite range bounded above by the aforementioned critical upper limit value (i.e., below the level where r/c value ceases to increase), the life becomes longer as r/c is larger, whereby higher life and higher reliability under lubrication with entrainment of foreign substances can be accomplished.

In the following, the critical significance of the respective numerical values shown in the claims of the present invention are to be explained.

Figure 1:
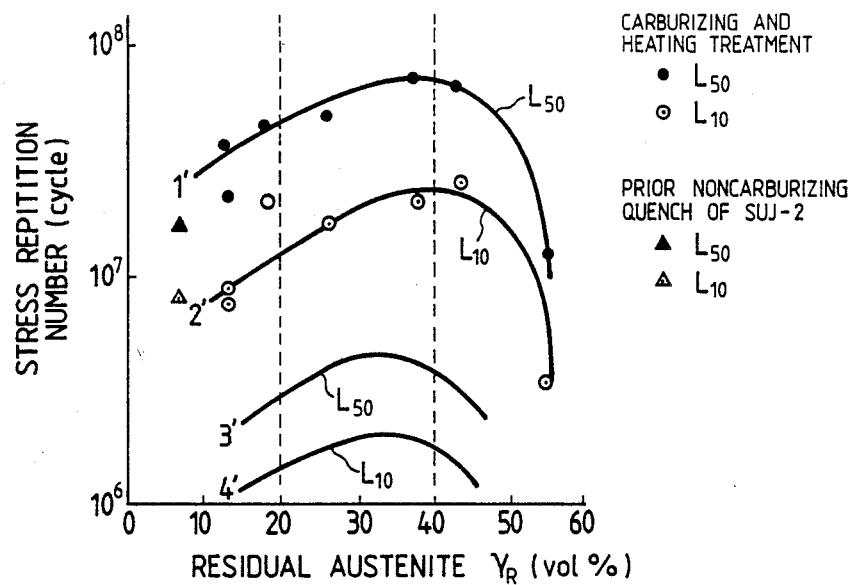
FIG. 1 is a graph showing the relationship between bearing rolling fatigue life of residual austenite content under clean lubrication and under lubrication with entrainment of foreign substances.
Figure 2:
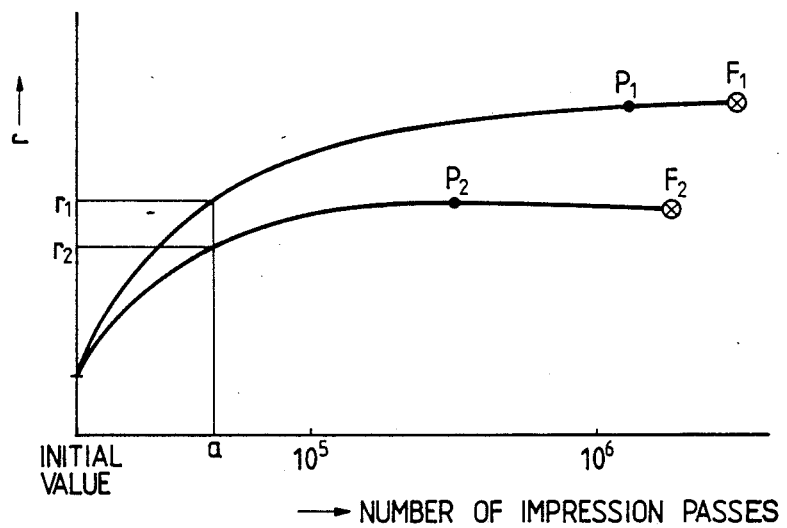
FIG. 2 is a graph showing the relationship between the radius of curvature r at the edge portion of impression and the number of passes over the impression.

FIG. 1 shows the relationship between bearing rolling fatigue life $L_{10}$ and $L_{50}$, indicated by stress repetition number (cycles), and residual austenite content.

In FIG. 1, the curves 1' and 2' show respectively the rolling fatigue life $L_{10}$ and $L_{50}$ under clean lubrication. On the other hand, the curves 3' and 4' show the rolling fatigue life $L_{10}$ and $L_{50}$ under lubrication with entrainment of foreign substances. What can be directly seen from FIG. 1 is that rolling fatigue life is different under clean lubrication and under lubrication with entrainment of foreign substances, and further that there is a range of $\gamma_R$ for optimum life. As compared with rolling fatigue life $L_{10}$ and $L_{50}$ of the heat-treated product of the bearing material steel of the prior art, the life at least equal thereto is ensured under clean lubrication, while the life is found to be prolonged as compared with the prior art under lubrication with entrainment of foreign substances.

When residual austenite $\gamma_R$ becomes 20 vol.% or more, both of rolling fatigue life $L_{10}$, $L_{50}$ are improved, but the life will be abruptly reduced if $\gamma_R$ greatly exceeds 40 vol.%, particularly 45 vol.%. Accordingly, the residual austenite in the surface layer of the inner and outer races and rolling members must be within the range of at least 20 vol.% to 45 vol.%.

FIG. 7 is a graph plotted in more detail showing bearing life under lubrication with entrainment of foreign substances. It can be clearly seen that both of rolling fatigue life $L_{10}$ and $L_{50}$ exhibit good life in the range a between the residual austenite of 20 vol.% and 45 vol.%, and even better life in the range b between 25 vol.% and 40 vol.%. The experimental conditions in FIG. 7 are as follows. For the life testing machine, the testing machine of the thrust form bearing steel as described in "Handbook of Special Steel" (First edition, edited by Denki Seiko Kenkyusho, Rikogakusha, May 25, 1969), p. 10 to 21, and the test was conducted under the following conditions: N=1000 rpm, Pmax=500 kg f/mm², lubricant oil: #68 turbine oil, dust: hardness Hv 870, $Fe_3C$ type powder: diameter 74–147 μm, 300 ppm.

Figure 6:
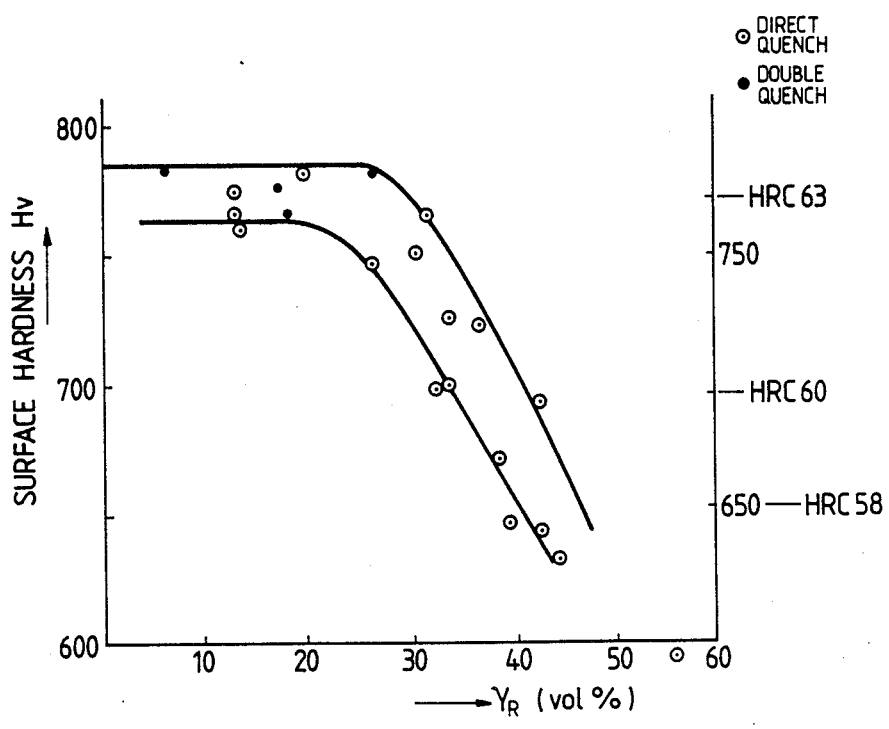
FIG. 6 is a graph showing the relationship between surface hardness Hv of carbon steel subjected to carburizing and heating treatment and the $\gamma R$ content.

Next, reference is made to FIG. 6. FIG. 6 is a graph showing the relationship between the respective surface hardness Hv and residual austenite $\gamma_R$ of inner and outer races and rolling members subjected to heating treatment by the two hardening methods of direct and double hardening (quenching). For obtaining life at least equal to that of the carburized steel bearing of the prior art under clean lubrication, it is desirable that the rolling members should have a $H_RC$ of 63 or more, and the inner and outer races are required to have a $H_RC$ of 58 or more. To verify this fact by the graph in FIG. 6, it can be understood that the residual austenite $\gamma_R$ must be at most 45 vol.% for inner and outer races and rolling members. Also, particularly for maintaining $H_RC$ of rolling members at 63 or more,, $\gamma_R$ should be preferably be around 30 vol.%. Also, what is particularly said only for rolling members is that $\gamma_R$ should be desirably 40 vol.% or lower, because if $\gamma_R$ becomes 45 vol.% or higher, the surface hardness is particularly reduced, whereby both rolling fatigue life $L_{10}$ and $L_{50}$ are lowered as can be seen in FIG. 1, and further rolling fatigue life $L_{10}$ and $L_{50}$ are also lowered under lubrication with entrainment of foreign substances, as can be seen in FIG. 1 and FIG. 7.

Next, the base carbon amount in the carbon steel for forming inner and outer races and rolling members, and the carburizing method are briefly described. In the carburizing method, since solid solution of carbon intoi the matrix is effected by both the base carbon existing initially in the matrix and the carbon diffused by penetration into the matrix by carburization, uniform solid solution can be obtained. In hardening of the bearing steel, the carbon content to form solid solution by the base carbon is limited to around 0.5%, but according to the carburizing method, it is possible to obtain a solid solution limit to a range exceeding 1%. By such high content, carbon atoms can inhibit migration of dislocation by rolling fatigue to prevent plastic deformation due to accumulation of dislocation, whereby generation of microcracks can be retarded to accomplish long life and high reliability of the rolling bearing.

The critical significance of the numerical value of the base carbon in the carbon steel to be used in the present invention is as described below.

First, inner and outer races are considered. If the ratio of the base carbon is lower than 0.1 wt.%, the carburizing time is prolonged. Also, the hardness at the core is deficient, whereby the core is subject to plastic deformation to shorten rolling fatigue life $L_{10}$ and $L_{50}$. On the contrary, if it becomes higher than 0.7%, the amount of carbon penetrated by carburization is decreased to lower the ratio of the carbon forming solid solution by penetration into the matrix, thus yielding a nonuniform solid solution state, with the result that the portion will become the source for stress concentration. Accordingly, the life $L_{10}$ and $L_{50}$ are lowered. From the above facts, the base carbon in inner and outer races should be within the range of 0.1 to 0.7 wt.%, above all more preferably 0.2 to 0.7 wt.%.

Next, the base carbon content in rolling members is to be considered for in the case of carbonitriding. When a carbon steel with 0.7 wt.% or less of carbon content is subjected to carbonitriding, the carbonitride during carbonitriding is decreased and desired rolling fatigue life is not obtained. On the contrary, if it exceeds 1.1 wt.%, carbonitride is excessively obtained, which becomes the source for stress concentration, whereby rolling fatigue life will be lowered when the bearing is used under lubrication with entrainment of foreign matter. Accordingly, from the above facts, the base carbon content in rolling members should be suitably within the range of 0.7 to 1.1 wt.%. By effecting carbonitriding in a carbon steel with carbon content within such range, carbon and nitrogen atoms will be diffused uniformly into Fe atoms to effect reinforcement by solid solution, whereby the effect of retarding generation of microcracks can be brought about. At the same time, the effect of relaxing stress concentration can be also brought about. What is particularly important is that the base carbon content within the range as described above is also the condition for precipitating 3 to 15 vol.% of carbonitride as will be described below.

The base carbon content in the case of carburizing rolling members has the same critical significance as mentioned for the amount of the base carbon of the inner and outer races as described above.

Finally, the ratio of carbonitride (referred as "CN" in FIG. 8) is described by referring to FIG. 8. Carbonitride as herein mentioned is, for example, $Fe_3C$, $Fe_4N$, etc. The experimental conditions for FIG. 8 are as follows. With cone rollers L44600R assembled in the bearing L44649/L44610, the test was conducted with attention only on the life of the rollers. Other various dimensions are c/p=2.13, N=4000 rpm, dust: Hv 870, 74–147 $\mu$m, 150 ppm. The soiid line shown in the graph in FIG. 8 is the life with only residual austenite, the broken line the life with the carbonitride in addition to the content of residual austenite. As can be seen from this graph, it can be understood that instead of only residual austenite, co-presence with carbonitride has further prolonged the life.

If the content of carbonitride is lower than 3 vol.%, carbonitride is too small in amount to make the rolling fatigue life effect of carbonitride smaller. On the contrary, if it is larger than 15 vol.%, carbonitride will grow to become coarse particles, which may become the source for stress concentration to lower rolling fatigue life $L_{10}$ and $L_{50}$. The C atoms forming solid solution in the matrix will be reduced to reduce residual austenite. As a result, desired rolling fatigue life $L_{10}$ and $L_{50}$ under lubrication with entrainment of foreign substances cannot be obtained. From the above facts, it has been found that the carbonitride contained in the surface layer of rolling members should be preferably 3 vol.% to 15 vol.%, more preferably 5 vol.% to 15 vol.%.

The test conditions in the respective Examples present invention and Comparative examples are shown in Table 1. In the Examples, by use of a box type testing machine produced by Nippon Seiko, cone roller bearing L44649 was subjected to dust-containing test. Various dimensions are as follows. c/p=2.13, N=4000 rpm, dust as foreign substances: Hv 550, 74–147 $\mu$m, 30 ppm. The results are shown in Table 2, and the rolling fatigue life and sound pressure level (dB) at that time were shown in the graph in FIG. 9. Since residual austenite is formed into martensite, namely hardened, while being transformed as induced by working by plastic deformation during formation of impression, as different from low carbon martensite which is merely low in hardness, the rolling fatigue life under lubrication with entrainment of foreign substances can be prolonged through the effect of enhanced surface hardness while accompanying stress concentration.

Of the Examples, particularly in Examples 3, 4 and 5, the ratios of carbonitride are set within the above optimum range as 6 vol.%, 11 vol.% and 15 vol.%, respectively, as shown in Table 2 and D, E and F in FIG. 9, sound pressure level (SPL) is lowered (namely low noise) and also the life prolonged as compared with Comparative examples 1–6 and other Examples 1–2.

The relationships between rolling fatigue life and sound pressure level in the respective Examples and the respective Comparative examples based on the test conditions in Table 1 are shown in Table 2 and FIG. 9. In the following, description is addressed to this relationship. In Comparative example 1, hardening heating treatment is applied by use of a bearing (SUJ-2) which is a hardened steel of the prior art for both inner and outer races, and rolling members, while in Comparative example 2, the carburized steel with the composition of the present invention subjected to carburizing and heating treatment was used only for inner and outer races, and a bearing steel of the prior art subjected to heating treatment for rolling members. In Comparative example 3, the carburized steel with the same composition was used for both of inner and outer races, and rolling members, but carburizing and heating treatment of the prior art was applied. In Comparative example 4, inner and outer races were subjected to hardening heating treatment by use of bearing steel of the prior art, and the carbonitriding and heating treatment of the present invention was applied only on the rolling members. In Comparative example 5, the carburized steel of the present invention was used for inner and outer races but applied carburizing and heating treatment of the prior art, and the carbonitriding and heating treatment was applied only on the rolling members. In Comparative example 6, the inner and outer races were subjected to the carburizing and heating treatment of the present invention, but the rolling members, which employ the carburized steel of the present invention, were subjected to the carburizing and heating treatment of the prior art.

TABLE 1

| | | Track race (Both inner and outer races) | | Rolling member | |
|---|---|---|---|---|---|
| H | Comparative Example 1 | SUJ2 HRC 63 | Hardening | SUJ2 HRC 63 | Hardening |
| A | Comparative Example 2 | SCR42OH HRC 62.0 | Carburizing hardening $\gamma_R = 31$ vol % | SUJ2 HRC 63 | Hardening |
| B | Example 1 | SCR42OH HRC 62.0 | Carburizing hardening $\gamma_R = 31$ vol % | SCR420H HRC62.7 | Carburizing hardening $\gamma_R = 20$ vol % |
| C | Example 2 | SCR42OH HRC 62.0 | Carburizing hardening $\gamma_R = 31$ vol % | SCR420H HRC62.1 | Carburizing hardening $\gamma_R = 30$ vol % |
| D | Example 3 | SCR42OH HRC 62.0 | Carburizing hardening $\gamma_R = 31$ vol % | 0.7% C steel Carbonitriding (Carbonitride 6 vol %) HRC63.5 | $\gamma_R = 36$ vol % |
| E | Example 4 | SCR42OH HRC 62.0 | Carburizing hardening $\gamma_R = 31$ vol % | 0.9% C steel Carbonitriding (Carbonitride 11 vol %) HRC64.0 | $\gamma_R = 31$ vol % |
| F | Example 5 | SCR42OH HRC 62.0 | Carburizing hardening $\gamma_R = 31$ vol % | 1.1% C steel Carbonitriding (Carbinitride 15 vol %) HRC 64.0 | $\gamma_R = 25$ vol % |
| G | Comparative Example 3 | SCR42OH HRC 62.6 | Carburizing hardening $\gamma_R = 18$ vol % | SCR42OH HRC 62.6 | Carburizing hardening $\gamma_R = 18$ vol % |
| I | Comparative Example 4 | SUJ2 HRC63 | | 0.9% C steel Carbonitriding (Carbonitride 11 vol %) HRC 64.0 | $\gamma_R = 31$ vol % |
| J | Comparative Example 5 | SCR42OH HRC 62.6 | Carburizing hardening $\gamma_R = 18$ vol % | 0.9% C steel Carbonitriding (Carbonitride 11 vol %) HRC 64.0 | $\gamma_R = 31$ vol % |
| K | Comparative Example 6 | SCR42OH HRC 62.0 | Carburizing hardening $\gamma_R = 31$ vol % | SCR42OH HRC 62.5 | Carburizing hardening $\gamma_R = 15$ vol % |

TABLE 2

| | | | L50 | SPL | SUJ2 | SCR42OH | 0.7% C | 0.9% C | 1.1% C |
|---|---|---|---|---|---|---|---|---|---|
| Comparative Example | 1 | H | X | △ | A B | | | | |
| | | | | | C | | | | |
| | 2 | A | X | X | A B | | $\gamma_R = 31\%$ | | |
| | | | | | C | | | | |
| | 3 | G | X | X | A B | | $\gamma_R = 18\%$ | | |
| | | | | | C | | $\gamma_R = 18\%$ | | |
| | 4 | I | X | △ | A B | | | | |
| | | | | | C | | | | |
| Example 1 | 1 | B | △ | X | A B | | $\gamma_R = 31\%$ | | |
| | | | | | C | | $\gamma_R = 20\%$ | | |
| | 2 | C | △ | X | A B | | $\gamma_R = 31\%$ | | |
| | | | | | C | | $\gamma_R = 31\%$ | | |
| | 3 | D | | | A B | | $\gamma_R = 30\%$ | | |
| | | | | | C | | | $\gamma_R = 36\%$, CN = 6% | |
| | 4 | E | | | A B | | $\gamma_R = 31\%$ | | |
| | | | | | C | | | $\gamma_R = 31\%$, CN = 11% | |
| | 5 | F | | | A B | | $\gamma_R = 31\%$ | | |
| | | | | | C | | | | |
| Comparative Example | 5 | J | X | △ | A B | | $\gamma_R = 18\%$ | | |
| | | | | | C | | | $\gamma_R = 31\%$, CN = 11% | |
| | 6 | K | X | X | A B | | $\gamma_R = 31\%$ | | |
| | | | | | C | | $\gamma_R = 15\%$ | | $\gamma_R = 25\%$, CN = 15% |

(Note) CN represents carbonitride, and all units mean vol. %.

Figure 10:
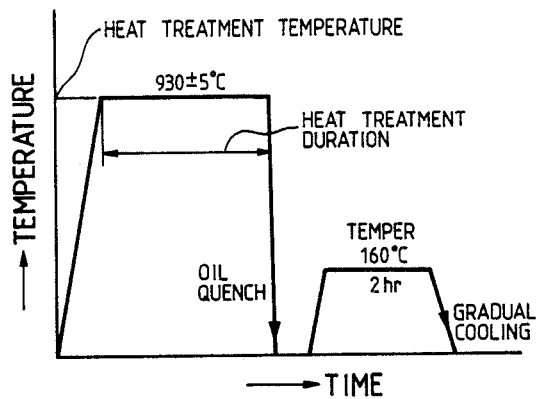
FIGS. 10, 11 and 12 are graphs showing respectively, relationships between the temperature and time for the direct carburizing and heating treatment, the double and heating treatment and the carburizing, carbonitriding and heating treatment, procedures used in the examples.
Figure 11:
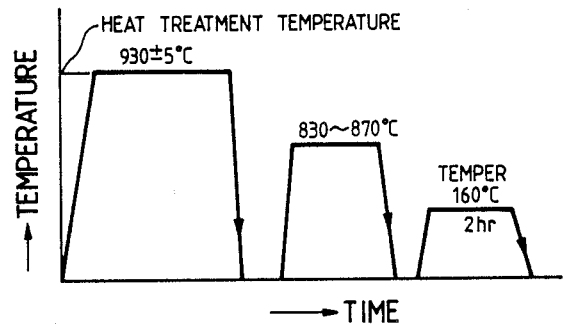
Figure 12:
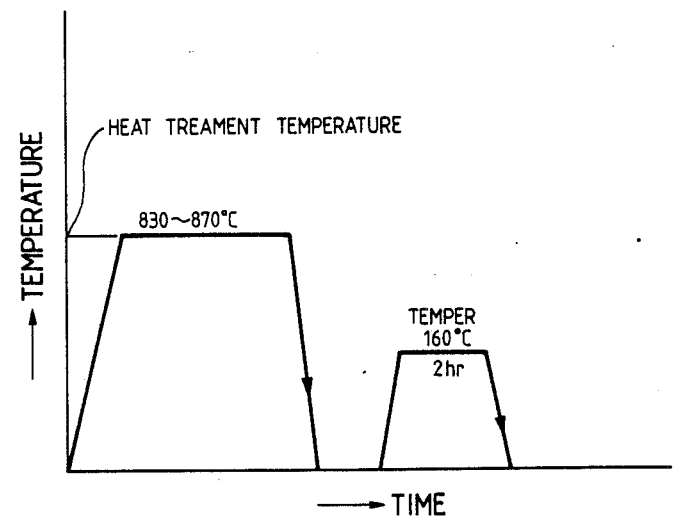

The heating treatment conditions in the respective Examples are described below. Of the carburizing and heating treatments, the direct hardening was effected by performing heating treatment at 930±5° C. in an atmosphere of Rx gas+enriched gas for about 8 hours as shown in the graph in FIG. 10, followed by oil hardening. The double hardening was effected by performing first the carburizing treatment at a heating treatment of 930±5° C. in an atmosphere of Rx gas+enriched gas, as shown in the graph in FIG. 11, subsequently performing the heating treatment at 830° to 870° C., followed by oil hardening. Further, as for carbonitriding and heating treatment, carbonitriding and heating treatment was performed at 830° to 870° C. in an atmosphere of Rx gas+enriched gas+5% of ammonia gas for about 3 to 4 hours, as shown in FIG. 12, followed by oil hardening.

As described in detail above, in Examples 1 to 5, carburizing and heating treatment were applied on the surface layer of a carbon seel containing 0.2 wt.% of C in both inner and outer races to make the residual austenite $\gamma_R$ in the surface layer 31 vol.%, which shows the optimum embodiment, but it is also possible to set either one of the inner and outer races as described above under the bearing use conditions as described below.

(a) The case when only the inner race is set under the above conditions and the outer race of the prior art is used.

In either the case of outer race rotation or inner race rotation, the contact pressure on the inner race rolling surface in the loading zone is greater, and the inner race will be peeled off at earlier stage than the outer race.

(b) The case when only the outer race is set under the above conditions and the inner race of the prior art is used.

Housing rigidity is low, and locally great contact pressure is applied in the loading zone under the state in which the rolling track of the outer race is deformed under the load, whereby the outer race will be peeled off at earlier stage than the inner race.

Also, I and J in FIG. 9 corresponding to Comparative examples 4 and 5 are lowered in SPL as compared with A of Comparative example 2 when attention is called only on sound pressure. Thus, in view of the this fact along with the fact as described above, when used together with the rolling members controlled to 5 to 15 vol.% of carbonitride in the surface layer by carbonitriding and to 20 to 45 vol.% of $\gamma_R$ by heating treatment, the inner and outer races described in I and J provided with the requirements shown in Table 1 can be also used.

As described, according to the rolling bearing of the present invention, the following effects can be obtained.

It has life at least equal to the bearing of the prior art when used under clean lubrication, and longer life than the bearing of the prior art when used under lubrication with entrainment of foreign substance, and also there can be provided a rolling bearing having high reliability in both cases when using the bearing under both conditions of lubrication as mentioned above.

Also, there can be also brought about the effect that SPL can be reduced as compared with the bearing of the prior art.

We claim:

1. A rolling bearing, comprising an inner race, an outer race and rolling members which roll therebetween, at least one of said inner and outer races having been subjected to carburizing and heating treatment, and wherein:

said one of said inner and outer races is made with carbon steel containing 0.1 to 0.7 wt.% of carbon and has a track surface layer with a residual austenite content of 20 to 45 vol.%, and said rolling members are made with carbon steel containing 0.7 to 1.1 wt.% of carbon and have been subjected to carbonitriding and heating treatment on respective surface layers thereof, with the residual austenite content in said surface layers of said rolling members being 20 to 45 vol.% and the carbonitride in said surface layers of said rolling members being 3 to 15 vol.%.

2. A rolling bearing according to claim 1, wherein the residual austenite content in said track surface layer is 25 to 40 vol.%, the residual austenite content in said surface layers of said rolling members is 25 to 40 vol.%, and the carbonitride in said surface layers of said rolling members is 5 to 15 vol.%.

3. A rolling bearing according to claim 2, wherein said one of said inner and outer races is made with carbon steel containing 0.2 to 0.7 wt.% of carbon.

4. A rolling bearing, comprising an inner race, an outer race and rolling members which roll therebetween, at least one of said inner and outer races having been subjected to carburizing and heating treatment, and wherein:

said one of said inner and outer races is made with carbon steel containing 0.1 to 0.7 wt.% of carbon and has a track surface layer with a residual austenite content of 20 to 45 vol.%, and said rolling members are made with carbon steel containing 0.1 to 0.7 wt.% of carbon and have been subjected to carburizing and heating treatment on respective surface layers thereof, with the residual austenite content in said surface layers of said rolling members being 20 to 45 vol.%.

5. A rolling bearing according to claim 4, wherein the residual austenite content in said track surface layer is 25 to 40 vol.%, and the residual austenite content in said surface layers of said rolling members is 25 to 40 vol.%.

* * * * *